Sept. 29, 1959     U. H. YOUNGBLOOD     2,906,056
EXTERMINATING DEVICE AND SYSTEM
Filed May 12, 1958     2 Sheets-Sheet 1
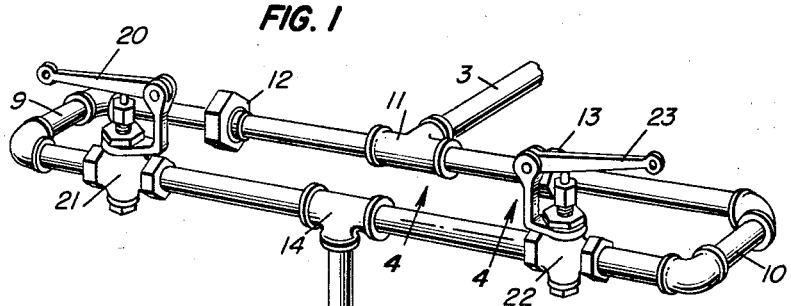
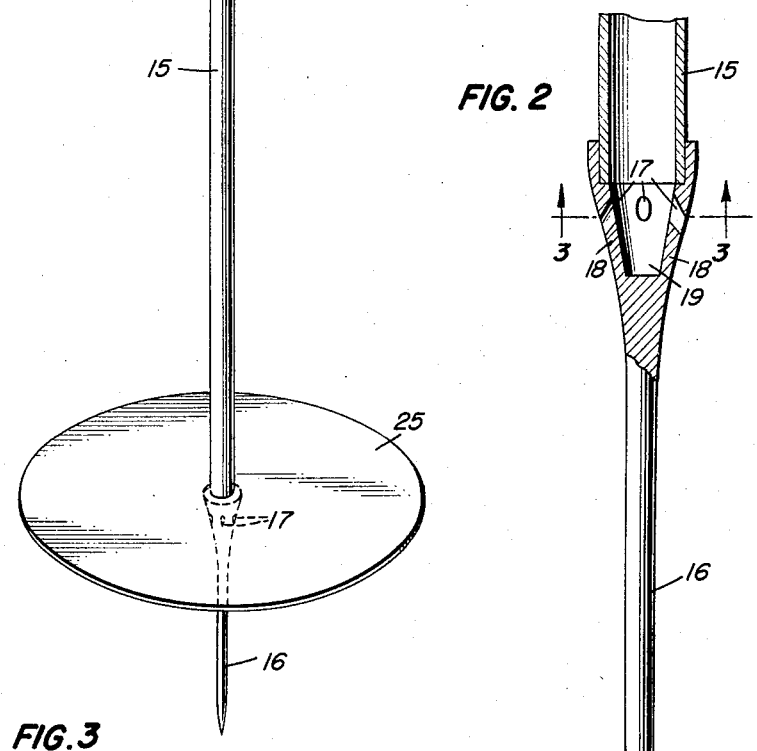
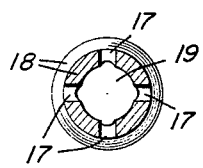
INVENTOR
Ulysse H. Youngblood
BY Adolph C. Hugin
ATTORNEY INVENTOR
Ulysse H. Youngblood BY Adolph C. Hugin
ATTORNEY

United States Patent Office 2,906,056
Patented Sept. 29, 1959

2,906,056

EXTERMINATING DEVICE AND SYSTEM

Ulysse H. Youngblood, Birmingham, Ala.

Application May 12, 1958, Serial No. 734,583

5 Claims. (Cl. 43—124)

This invention relates to exterminating devices and systems, and more particularly to an improved system and device for more effectively exterminating insects, such as ants.

In certain areas, ants, and particularly those known as fire ants, have become extremely destructive. Present measures for controlling and exterminating such insects generally require that the area be very thoroughly worked over, and that considerable amounts of poisonous material be deposited in and over the soil. After the poisonous material has been deposited in the soil, it is usually necessary to allow it to remain fallow for a couple of years, and the nature of the poison is such that generally it is undesirable to allow domestic animals to graze on the land. It also often is necessary repeatedly to treat affected areas in order to eliminate the fire ant pests, and unless very large areas are treated the extermination is useful for a maximum of five years.

An object of this invention is to provide an improved device and system for exterminating insects, such as fire ants, without having to work over the entire area by providing for applying the exterminating material more effectively directly to each ant colony.

Another object of this invention is to provide an improved exterminating fluid distributing device for more effectively penetrating the soil where a colony of ants have settled.

A further object of this invention is to provide an improved exterminating material distributing device which is more effective in applying the exterminating material directly in the soil where a colony of insects have settled and also for more effectively applying or spraying exterminating material over insects which may escape from the colony over the adjacent soil.

A still further object of this invention is to provide an improved exterminating material distributing device which is effective in efficiently applying exterminating material in a colony of insects, which is constructed to allow the use of a different distributing pressure for spraying material over the area adjacent to the colony than is required for injecting it into the soil where the colony has settled, and which is also provided with a shield for protecting the operator from the splash of exterminating material against the operator's person and also for redeflecting splashed exterminating material back to the adjacent soil.

Further objects and advantages of this invention will become apparent from the following description referring to the accompanying drawings, and the features of novelty which characterize this invention will be pointed out with particularity in the claims appended to and forming a part of this specification.

In the drawings:

Fig. 1 is a perspective view of an improved exterminating fluid distributing device embodying the features of this invention;

Fig. 2 is an enlarged elevational view, partly in section of the soil penetrating end of the distributing needle forming a part of the device shown in Fig. 1;

Fig. 3 is a sectional view taken along line 3—3 of Fig. 2, showing the arrangement of the nozzle apertures formed in the soil penetrating needle;

Figure 5:
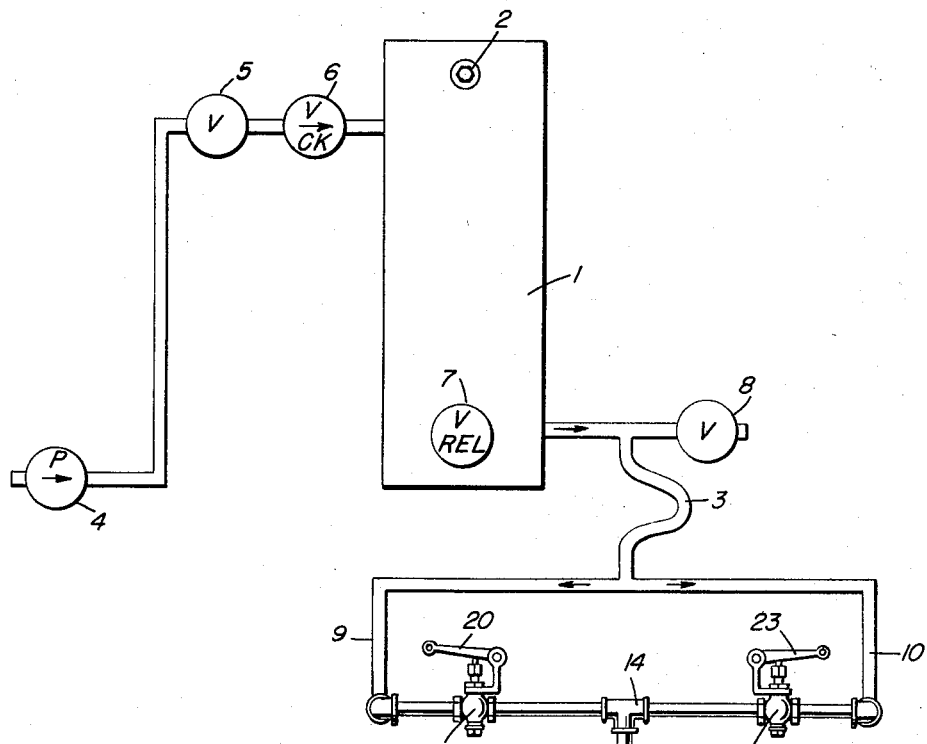
Fig. 5 is a schematic illustration of an improved exterminating system incorporating the features of this invention.

Referring to the drawings, an embodiment of an improved exterminating material distributing device and system made in accordance with this invention is illustrated, in which a suitable exterminating material, preferably in fluid form, is adapted to be stored in a suitable storage container or tank 1 and to be transported therein to the area where it is to be used. This tank forms the primary source of exterminating material for the system and may be filled or replenished with exterminating fluid through a suitable filling opening which is preferably closed by a sealing cap or plug 2. In practice, such a storage tank usually will be mounted upon a suitable conveyor, such as a truck, and the exterminating fluid generally will be in the nature of a liquid which can readily be poured into the tank through the filling opening. The tank 1 is adapted to be connected to an improved material distributing device through a suitable flexible connection, such as a hose 3, and the material preferably is caused to pass from the tank 1 to the exterminating device under air pressure.

This air pressure can conveniently be provided by a conventional air compressor or pump 4 connected to the tank 1 through a suitable gate valve 5 and a check valve 6, which will provide for admitting air under pressure to the tank 1 and prevent its reverse escape from the tank. Suitable control means of any well-known type may be used for controlling the operation of the air compressor 4 for maintaining the pressure within the tank 1, and such control means forms no part of the present invention. The tank 1 also preferably is provided with a pressure relief valve 7 which may be set at a safe operating value, for example at 125 pounds per square inch pressure to prevent accidentally subjecting the tank and the connected distributing apparatus to destructive pressures. A drain valve 8 also preferably is provided for draining and cleaning of the tank 1 when desired.

In accordance with this invention, it is desirable that exterminating material should be applied directly to colonies of insects within the soil and over the immediate surface of the soil adjacent to such colonies. Also, it will usually be found desirable to dig up or stir up the subjacent soil where a colony of insects has been found and to spray and mix exterminating material into this subjacent soil. In this manner of treating the soil for exterminating the insect colonies, it becomes unnecessary to dig up the entire area, and the exterminating material is more efficiently applied to those parts of the area where it will be most effective for exterminating the insects. In order thus to apply exterminating material to the affected areas, the improved material distributing device preferably is constructed so that it can readily penetrate the soil and can also be used for digging and mixing the soil over a colony of insects. With such a device it also is desirable that the exterminating material should be expelled from the device at a relatively high pressure in the soil where the colony has settled, and at a relatively low pressure over the soil and in the loosened soil directly over the insect colony. The distributing device illustrated in Figs. 1 and 5 is especially well adapted to carry out this type of treatment for more effectively applying exterminating material into and over infested soil areas.

The detailed construction of the improved exterminating material distributing device shown in the drawings includes a valved arrangement for supplying material at two different pressures from the single source of supply through the connecting hose 3 to a distributing nozzle. This valved arrangement may conveniently be constructed in the form of a carrying handle, and includes a pair of parallel connected material distributing pipe sections 9 and 10, in substantially U-shaped alignment, connected to the distributing hose 3 by a suitable T-joint 11. In order to facilitate assembly and disassembly of the pipe sections 9 and 10, suitable unions 12 and 13 may be used in the pipe sections for connecting them to the T-joint 11. The ends of the pipe sections 9 and 10 opposite the T-joint 11 are adapted to be connected together and to a soil penetrating needle by another T-joint 14. The soil penetrating needle preferably is formed with a relatively long tubular shank 15, which may take the form of a rigid pipe, and preferably is screwed into the stem of the T-joint 14 to extend at substantially right angles to the plane of the two pipe sections 9 and 10. Such a construction provides for using the pipe sections 9 and 10 as a convenient carrying handle for the material distributing device and provides a handle having a substantial leverage for forcing the material distributing needle into the soil, as well as for withdrawing it from the soil.

In order to provide for more easily forcing the material distributing needle into the soil, the shank 15 preferably is provided with a sharply pointed end 16 on the end thereof opposite its connection to the pipe sections 9 and 10. This sharply pointed end 16 not only facilitates the penetration of the soil but also forms a closure for the end of the shank 15 to prevent the entrance of foreign material thereinto which might clog the passage through the shank 15, and in the preferred embodiment illustrated in the drawings, the pointed end 16 conveniently is formed as a nozzle having a plurality of fluid outlet apertures 17. These outlet apertures 17 extend through walls 18 which form a pocket 19 in the end of the pointed end member which communicates with the fluid passage through the shank 15. This forms a nozzle over the outer end of the shank 15 which can readily be forced deep into the soil and directly into a colony of insects for distributing exterminating material directly into the subterranean passages of the insect colony.

High pressure exterminating fluid can be supplied to the nozzle outlet apertures 17 through the shank 15 from the supply hose 3 through one of the pipe sections 9 in a direct fluid passage connection by manipulation of a valve handle 20 so as to open a gate valve 21 connected in the pipe section 9. A second gate valve 22, with an operating handle 23, is connected in pipe section 10, and normally is held in its closed position when it is desired to supply exterminating fluid at high pressure through the gate valve 21 to the nozzle outlet apertures 17 of the soil penetrating needle. For most operations it will be found that a fluid pressure of approximately 100 pounds per square inch will provide for the satisfactory distribution of exterminating fluid into the soil, and that this pressure will be sufficient to cause the exterminating fluid to penetrate most of the subterranean passageways which are connected to the main insect colony and thus will effectively impregnate all of the connecting passages and chambers of such a colony with the exterminating fluid.

When treating colonies of insects, such as fire ants, with exterminating fluid, it will generally be found that a number of the insects will be traveling to and from the main colony over the adjacent soil, and after exterminating fluid has been forced into the colony, a further number of insects will seek refuge by escaping from the soil around the spray needle, so that an effective operation will require that these escaping insects be sprayed additionally with the exterminating material. Some of the insects will also seek refuge under loose material lying on the soil adjacent to the entrance to the colony, and an effective exterminating operation will require that these insects also be subjected to the effects of the exterminating material. The improved exterminating material distributing device illustrated in the drawings is also particularly well adapted to perform this latter treatment.

The pointed end 16 of the spray needle can be very efficiently utilized for digging up the upper layer of soil around the entrance to the colony and simultaneously spraying this soil with exterminating material through the fluid outlet apertures 17. During this operation, it generally is desirable to spray the exterminating material at a lower pressure than that which is used to supply it into the subterranean colony. In order to simplify the exterminating system, it is desirable to avoid a duplication of the material supplying equipment, and, therefore, provision is made for utilizing the high pressure fluid which is supplied by the hose 3 to the U-shaped pipe sections 9 and 10 also to supply fluid to the distributing device for the low pressure spraying operations. An arrangement is, therefore, provided for reducing the pressure of the fluid supplied by the hose 3 to the nozzle outlet apertures 17 when desired. This can conveniently be done by causing the high pressure fluid in pipe section 10 to pass through a suitable pressure reducing orifice, which may be placed in any convenient part of this pipe section, so that operation of the valve 22 will cause exterminating fluid to pass through the pipe section 10 to the needle shank 15 at a relatively lower pressure than that at which it is supplied to this section by the hose 3.

Figure 4:
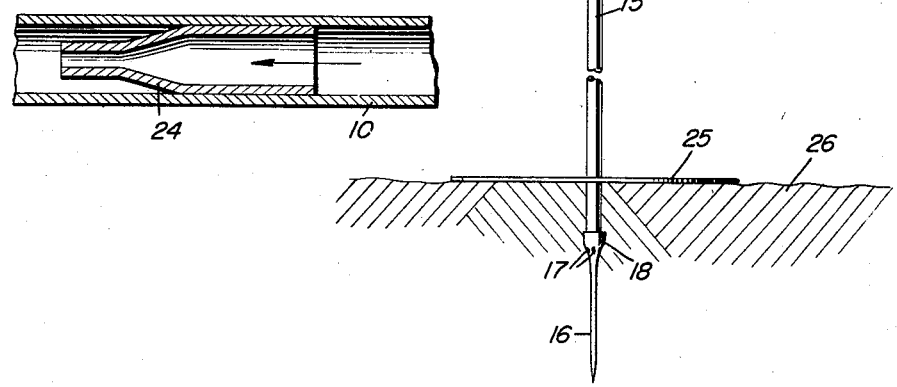
Fig. 4 is a sectional view taken along line 4—4 of Fig. 1 showing a pressure reducer which may be used in conjunction with the device illustrated in Figs. 1 and 5 of the drawings.

As shown in Fig. 4, a pressure reducing orifice can very readily be formed by a conventional pipe reducer 24 inserted in a leg of the U-shaped pipe section 10. In Fig. 1, this reducer is shown as inserted in the leg of the pipe section 10 which connects directly to the T-joint 14; however, it could equally well be placed in any other part of this pipe section between the T-joints 11 and 14. With such an arrangement the exterminating fluid can be sprayed, at a relatively low pressure of around 10 pounds per square inch, for application to the soil and insects which are dug up around the opening to the insect colony, by operation of the handle 23 to open the gate valve 22, while keeping the valve 21 in its closed position.

As shown in Fig. 1, the fluid distributing device can conveniently be formed of conventional pipe and valve components, which are interconnected by conventional T-joints, elbows, and unions to provide interconnected passageways throughout the distributing device, extending from the fluid supply hose 3 to the nozzle outlet apertures 17.

In many instances it will be found that the spraying of the exterminating fluid into and over the soil adjacent to the entrance to an insect colony will result in a splashing or splattering of the exterminating material, and this usually would be very undesirable in that it would result in the loss of some of the material and might also splash on the clothing of the operator. In order to minimize such waste of material and in order to protect the operator against splashing of the fluid, a splash shield 25, preferably in the form of a disc, is mounted on the shank 15 freely slidable longitudinally thereof, and is adapted by gravity to remain at substantially the lowermost point on the shank above ground. In this manner, the splash shield will move upwardly along the shank 15 as the pointed end 16 penetrates the soil 26, as is more clearly shown in Fig. 5, and will travel to the lowermost end of the shank 15 directly above the nozzle outlet apertures 17, as shown in Fig. 1, when the spray needle apertures 17 are above the surface of the soil, thus effectively redeflecting exterminating fluid back to the soil if it is splashed upwardly as it is sprayed over the soil.

The particular configuration and arrangement of this splash shield, as well as of various other mechanical details of the improved exterminating material distributing device and of the improved exterminating system, can readily be modified to provide the desired results without departure from the spirit and scope of the present invention. Modifications of the embodiment of this invention which has been illustrated and described will occur to those skilled in the art. It is to be understood, therefore, that this invention is not to be limited to the particular arrangements disclosed, and it is intended in the appended claims to cover all modifications within the spirit and scope of this invention.

I claim:

1. An exterminating fluid distributing device including a soil penetrating needle comprising a pointed end and a shank rigidly connected thereto having a fluid supply passage therethrough, nozzle means adjacent to said pointed end and having a plurality of fluid outlet apertures connected with said shank fluid passage, and means for connecting said shank fluid passage to a fluid supply source having means for regulating the flow and pressure of fluid to said nozzle means, said regulating means comprising parallel connected fluid passage means between the fluid source and said needle shank including a direct fluid passage connection comprising a manually controllable pressure regulating valve and a parallel pressure reducing fluid passage means comprising a pressure reducer and a second manually controllable pressure regulating valve.

2. An exterminating fluid distributing device including a soil penetrating needle comprising a pointed end and a shank rigidly connected thereto having a fluid supply passage therethrough, nozzle means adjacent to said pointed end connected with said shank fluid passage, means for connecting said shank fluid passage to a fluid supply source having means for regulating the flow and pressure of fluid to said nozzle means, said regulating means comprising a direct fluid passage connection of the fluid supply source to said nozzle comprising a pressure regulating valve and a pressure reducing fluid passage connection of the fluid supply source to said nozzle comprising a pressure reducer and a second pressure regulating valve, and a splash shield on said shank mounted slidable longitudinally thereof whereby fluid deflected upwardly is redeflected away by said shield.

3. An exterminating fluid distributing device including a soil penetrating needle comprising a pointed end and a shank rigidly connected thereto having a fluid supply passage therethrough, nozzle means adjacent to said pointed end and having a plurality of fluid outlet apertures connected with said shank fluid passage, means for connecting said shank fluid passage to a fluid supply source having means for regulating the flow and pressure of fluid to said nozzle means, said regulating means comprising parallel connected fluid passage means between the fluid source and said needle shank including a direct fluid passage connection comprising a manually controllable pressure regulating valve and a parallel pressure reducing fluid passage means comprising a pressure reducer and a second manually controllable pressure regulating valve, said connecting means being constructed and arranged to provide handle means for manipulating said device and said fluid passage connections to said nozzle means being rigid in order to facilitate handling of said device, and a splash shield mounted on said shank slidable longitudinally thereof and adapted by gravity to remain at substantially the lowermost point on said shank above ground whereby an operator is protected against splashing of fluid and fluid deflected upwardly is redeflected away from said shank by said shield.

4. An exterminating system comprising an exterminating fluid supply source for containing exterminating fluid under pressure, means for distributing exterminating fluid including a soil penetrating spray needle having a pointed end and a shank rigidly connected thereto having a fluid passage therethrough, nozzle means adjacent to said pointed end and having a plurality of fluid spray outlet apertures connected to said shank fluid passage, means connecting said shank fluid passage to said fluid supply source having means for regulating the flow and pressure of fluid from said source to said nozzle means, said regulating means comprising a direct fluid passage connection between said source and said shank comprising a pressure regulating valve, and a pressure reducing fluid passage connection paralleling said direct connection comprising a pressure reducer and a second pressure regulating valve, and a splash shield mounted on said shank slidable longitudinally thereof whereby an operator is protected against splashing of fluid and fluid deflected upwardly is redeflected away by said shield.

5. An exterminating system comprising an exterminating fluid supply source for containing exterminating fluid under pressure, means for distributing exterminating fluid including a soil penetrating spray needle having a pointed end and a shank rigidly connected thereto having a fluid passage therethrough, nozzle means adjacent to said pointed end and the outer end of said shank and having a plurality of fluid spray outlet apertures connected to said shank fluid passage, means connecting said shank fluid passage to said fluid supply source having means for regulating the flow and pressure of fluid from said source to said nozzle means, said regulating means comprising a dual basic pressure system including a direct fluid passage connection between said source and said shank comprising a manually controllable pressure regulating valve and a pressure reducing fluid passage connection paralleling said direct connection comprising a pressure reducing orifice and a second manually controllable pressure regulating valve, and a splash shield on said shank mounted freely slidable longitudinally thereof and adapted by gravity to remain at substantially the lowermost point on said shank above ground whereby an operator is protected against splashing of fluid and fluid deflected upwardly is redeflected away from said shank by said shield.

References Cited in the file of this patent

UNITED STATES PATENTS

| | | |
|---|---|---|
| 1,492,732 | Knopf | May 6, 1924 |
| 2,083,153 | Irish | June 8, 1937 |